United States Patent [19]

Goodman

[11] Patent Number: 4,800,703
[45] Date of Patent: Jan. 31, 1989

[54] HORIZONTAL POUCH PACKER

[75] Inventor: James A. Goodman, Glencoe, Ill.

[73] Assignee: Prototype Equipment Corp., Lake Forest, Ill.

[21] Appl. No.: 893,580

[22] Filed: Aug. 6, 1986

[51] Int. Cl.⁴ .............................................. B65B 5/08
[52] U.S. Cl. ......................................... 53/53; 53/244; 53/247; 53/251; 53/498; 53/538
[58] Field of Search .................. 53/53, 244, 54, 247, 53/250, 251, 537, 538; 55/493, 500, 504, 498; 198/429, 432

[56] References Cited

U.S. PATENT DOCUMENTS

| | | | |
|---|---|---|---|
| 3,676,978 | 7/1972 | Gottweis et al. | 53/244 X |
| 3,710,543 | 1/1973 | Toss | 53/244 |
| 3,774,778 | 11/1973 | Flaig | 53/247 X |
| 3,834,115 | 9/1974 | Johnson et al. | 53/251 X |
| 3,874,144 | 4/1975 | Feigel | 53/538 X |
| 3,920,128 | 11/1975 | Baker | 53/247 X |
| 4,043,097 | 8/1977 | Ishida et al. | 53/538 X |
| 4,507,908 | 4/1985 | Seragnoli | 53/498 |
| 4,510,730 | 4/1985 | Edmondson | 53/53 |
| 4,611,458 | 9/1986 | Prakken | 53/251 X |
| 4,633,653 | 1/1987 | Roberts et al. | 53/498 |

Primary Examiner—James F. Coan
Assistant Examiner—Steven P. Weihrouch
Attorney, Agent, or Firm—Willian Brinks Olds Hofer Gilson & Lione Ltd.

[57] ABSTRACT

A packing machine for pouches or other flexible container is provided having an indexable conveyor, a feed means which discharges pouches onto said indexable conveyor, a sensing means for indexing the conveyor, a variable stroke vacuum head assembly with a vacuum shroud for transporting and packing the pouches, and means to vary the length of stroke of the vacuum head assembly.

2 Claims, 8 Drawing Sheets

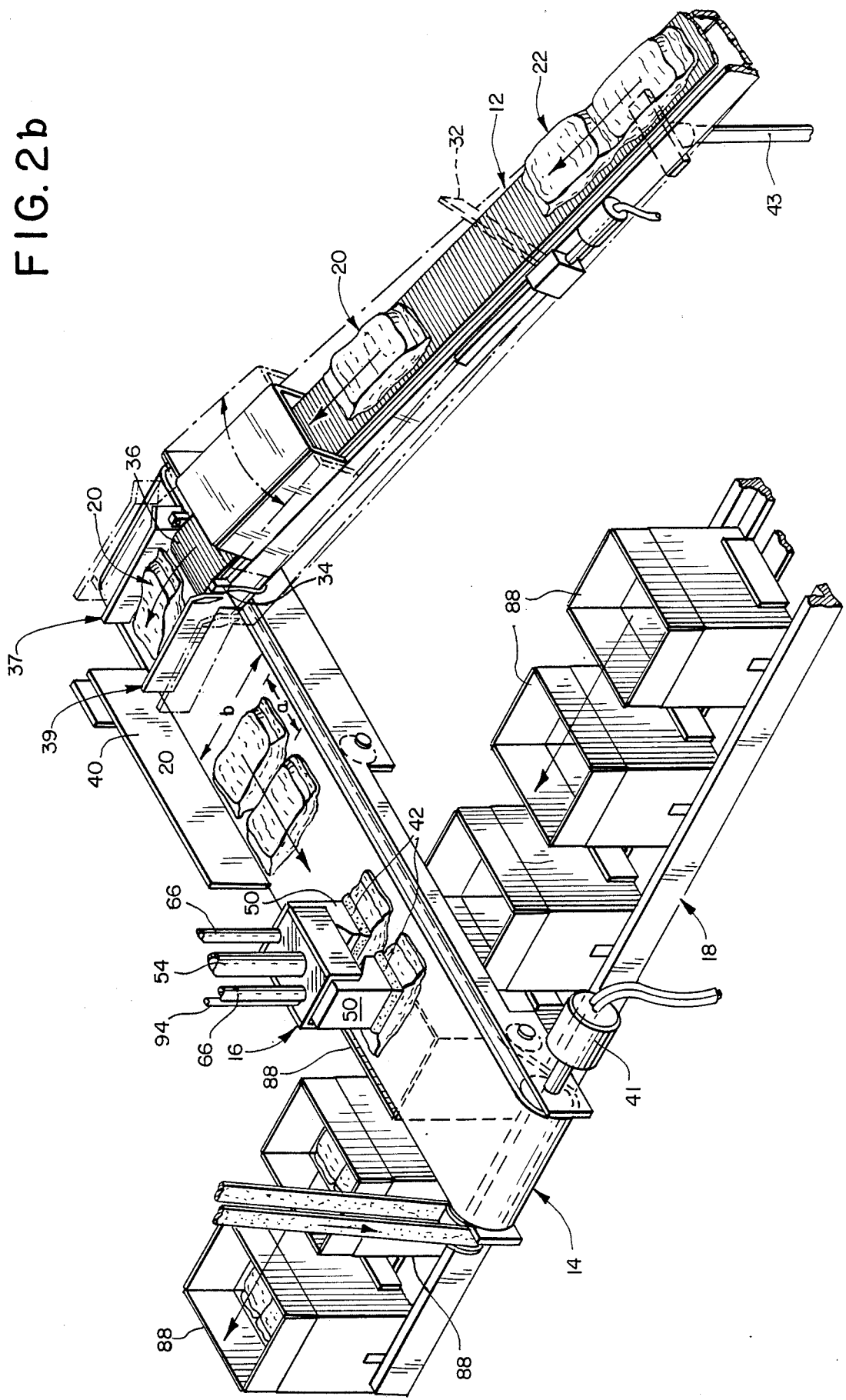

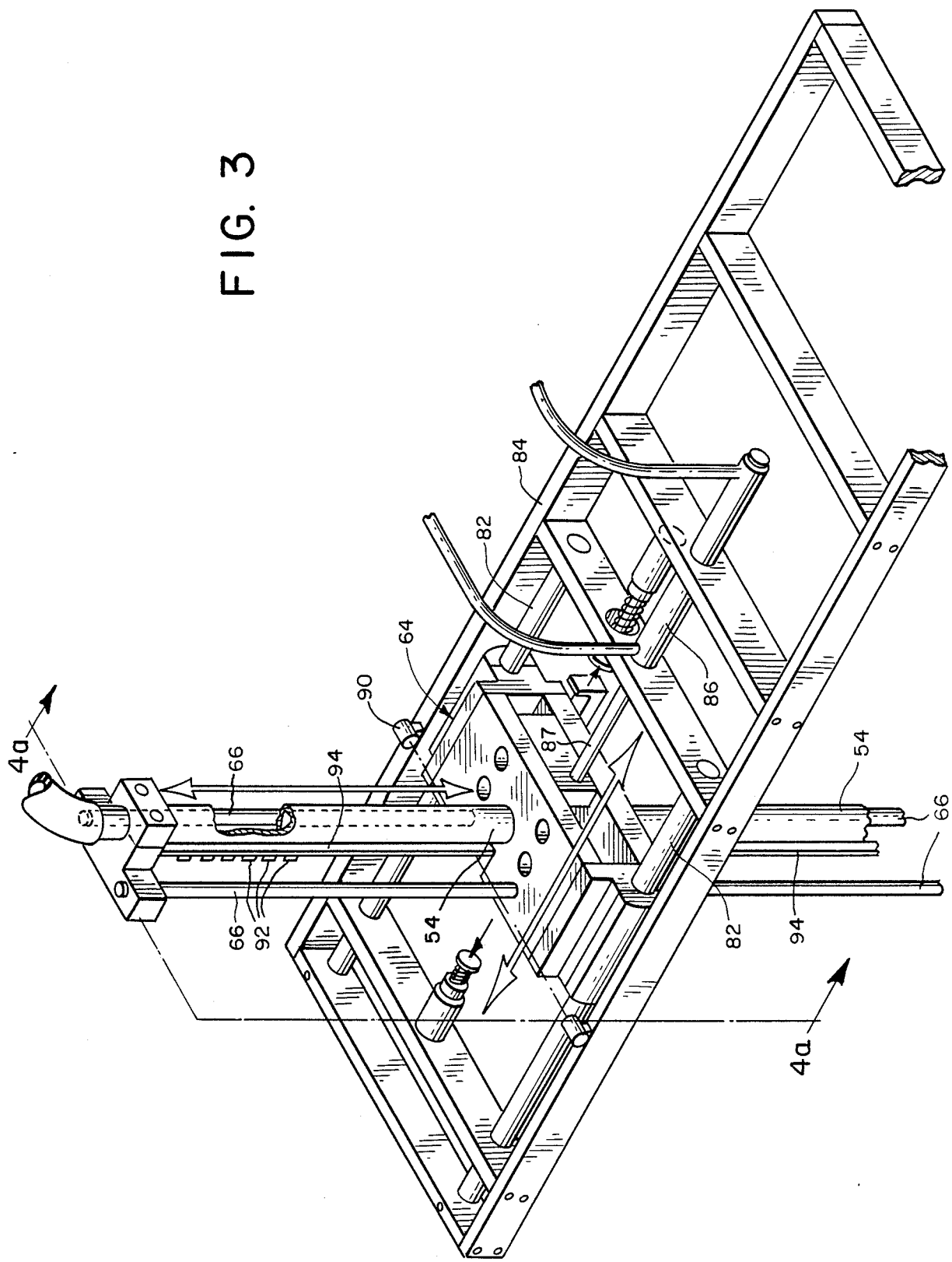

HORIZONTAL POUCH PACKER

BACKGROUND OF THE INVENTION

This invention concerns an on-demand packing mechanism for flexible pouches generally used as packaging for smaller, discrete items.

Flexible pouches, formed by crimping and sealing the ends of a tubular section of cellophane, plastic wrap, or foil, are used to prepare such items as nuts, candies, other snack foods and a variety of other discrete items for sale to the individual consumer. These pouches offer a number of significant advantages over other possible containers. These advantages include lighter weight, lower cost, and ease of filling.

Case packing these flexible, irregularly-shaped pouches for shipment so as to make efficient use of space, however, has proven to be difficult. The undefined shape of the bag makes pushing, pulling, or grabbing it problematical. Conveyors have generally proven useful in transporting the bags but not for packing them in boxes. Some prior art machines have used suction cups to grip the bags. The relatively powerful vacuum required, however, together with the small area over which each suction cup acts against the bag, increases the probability of bag damage. In addition, the relatively inflexible positioning of the suction cups relative to each other prevents, to some extent, adaptability of the packing machine to different sizes of pouches.

One problem prevalent with many prior art conveyors used to transport pouches is that the conveyors have stationary sidewalls. The pouches, if misaligned or placed too far from the center of the conveyor, tend to catch against these sidewalls which slow the pouches' forward movement, thereby changing the spatial relationship and time interval between the pouches.

In addition, bags may be fed at irregular intervals into a packing machine. Most prior art machines for case packing are not suitable for packing pouches. These prior art case packing machines rely on the creation of a sizable backlog of the product, and then physically pushing the product to create rows suitable for packing. These prior machines cannot provide an on-demand packing system for pouches. The flexible and fragile nature of the pouches precludes the use of a packing technique which creates a backlog or relies on pushing the package.

Finally, no prior art packing machines adjust the spacing of the pouches, such as by nestling them together, so as to pack them as efficiently as possible.

SUMMARY OF THE INVENTION

The present invention contemplates an improved packing machine for pouches or other flexible containers which provides improved lifting and carrying means and more efficient use of space in packing. These objects are achieved by providing an indexable, on-demand conveyor which positions the pouches for lifting, a vacuum head assembly which includes vacuum shrouds or vacuum cups, depending on the product, for lifting and nestling the pouches, and a means for varying the depth of placement of the pouches in the box by varying the stroke length of the vacuum head assembly. In one embodiment of the invention, pouches are fed onto the indexable conveyor by means of a feed conveyor. The feed conveyor has a means for rejecting pouches which are too close together for the indexable conveyor to accept. Indexing or positioning means are also provided to control the stroke length and discharge position for the vacuum head assembly. In the illustrated embodiment, the length of stroke of the vacuum head assembly is determined using flags or other suitable signal means mounted on a shaft which moves with the head assembly and a photoelectric sensor for determining the number of flags which pass a given point, and therefore the depth achieved, on each stroke.

BRIEF DESCRIPTION OF THE DRAWINGS

The novel features which are characteristic of the invention are set forth in the appended claims. The invention itself, together with further objects and advantages will be best understood by reference to the following description of the illustrated embodiment taken in connection with the accompanying drawings, in which:

FIG. 2b is a fragmentary perspective view of a portion of an alternate embodiment of the packing machine depicted in FIG. 1;

FIG. 3 is a fragmentary perspective view of the vacuum head assembly carriage and its guides;

DETAILED DESCRIPTION

Figure 1:
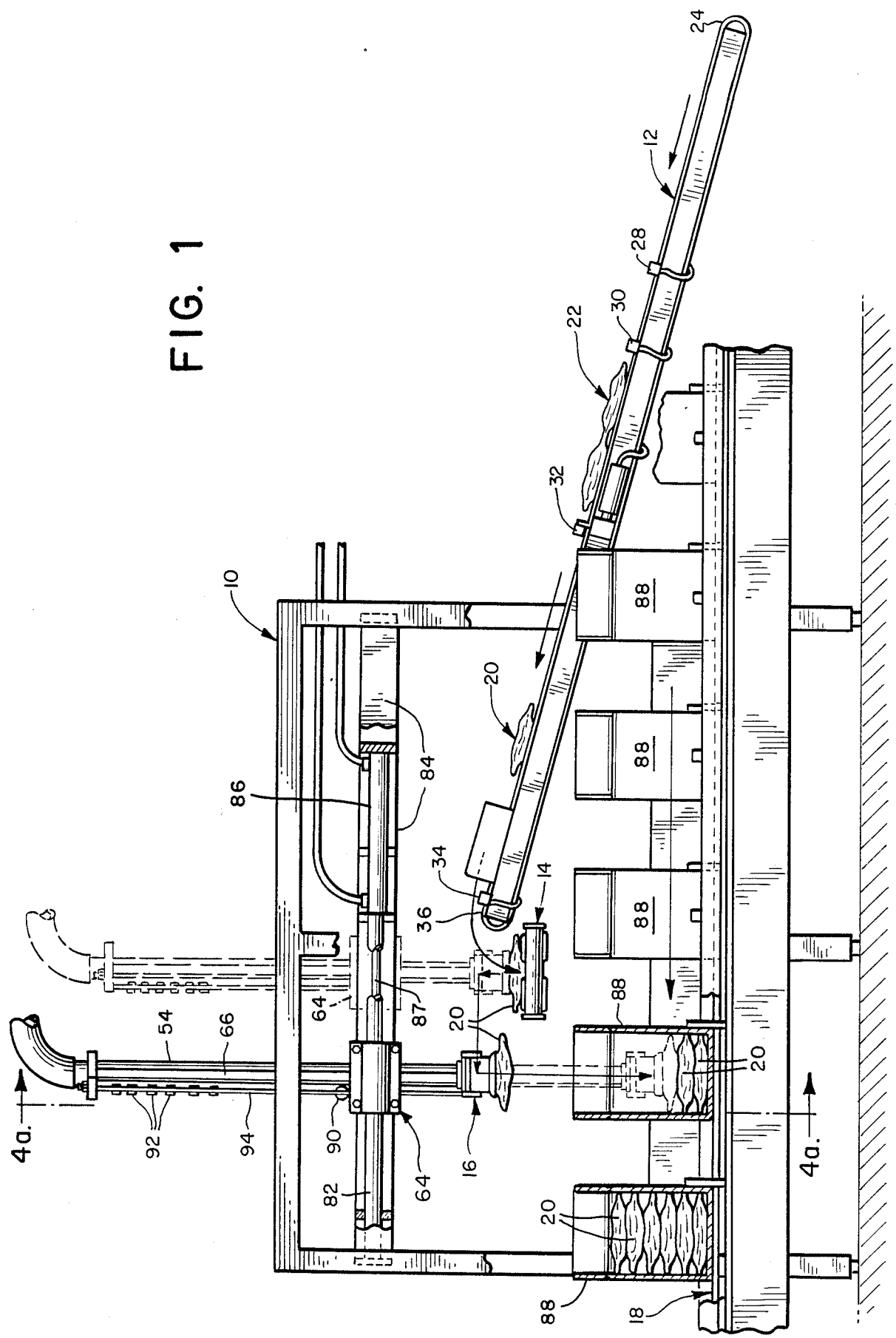
FIG. 1 is an elevational view of a packing machine embodying the present invention.

With reference to the drawings, there is shown in FIG. 1, as an example of the preferred embodiment of the present invention, a packing machine generally indicated by the reference numeral 10. This packing machine 10 is described below first in terms of its major structural elements and then in terms of its functional elements which cooperate to perform the packing function. The primary structural elements of the packing machine 10 are the inclined feed conveyor 12; the indexable cross-conveyor 14; the shroud head and guide assembly 16; and the box conveyor 18. The overall functions of this machine are regulated by any suitable programmable logic controller (not shown).

Figure 2A:
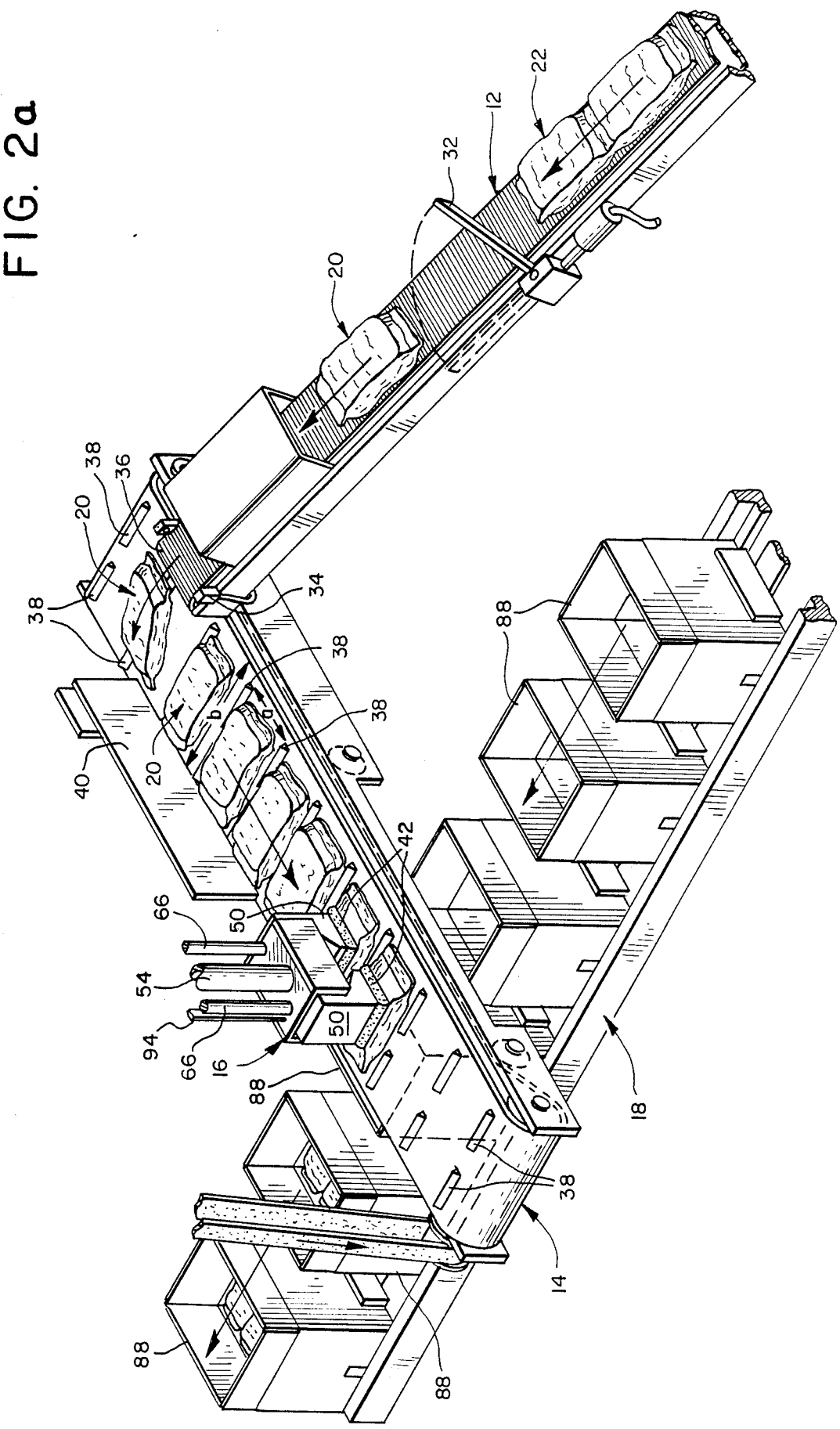
FIG. 2a is a fragmentary perspective view of a portion of one embodiment of the packing machine depicted in FIG. 1.

Filled pouches 20, 22 are fed onto the conveyor 12 at the receiving end 24. The pouches 20, 22 are propelled up the incline by the feed conveyor 12 and past two photoelectric cells 28, 30. As each pouch 20, 22 travels up the feed conveyor 12 it breaks beams emitted by two light sources (not shown) which are positioned opposite photoelectric sensors 28, 30. These photoelectric sensors 28, 30 are tied to the programmable logic control system which determines the existence of bag feeding failure modes. These failure modes include double bagging, as shown at 22, and loading of two bags in closer proximity to each other than the machine operational sequence will allow. When the photoelectric sensors 28, 30 register either of these failure modes, the control system activates a lever 32 (See FIGS. 2a and 2b), powered by a hydraulic source (not shown). This lever 32 then swings out across the conveyor 12 from its at rest position parallel to the conveyor path. As shown in FIG. 2a, the lever 32, in its activated position, is at a slight angle from perpendicular to the feed conveyor path. Thus the lever 32 in its activated position deflects to the side, and thereby rejects, any double bags or pairs of bags fed too close to each other. After a preset time during which double bags 22 or improperly fed bags are deflected, the control system deactivates the lever 32 returning it to its original position parallel to the feed conveyor 12 path, as shown in FIG. 2b.

Properly fed bags 20 continue up the feed conveyor, past another photoelectric sensor 34, to the end 36 of the feed conveyor 12. Each bag 20 then drops onto an open space on the cross conveyor 14 at the bag index station. The control system registers when the bag 20 crosses the photoelectric cell 34 and, after a time delay, indexes the cross conveyor 14 horizontally by a fixed, but adjustable, preset distance. Thus, the cross conveyor 14 indexes immediately after each bag 20 drops onto it so as to leave an open space for each subsequent bag at the index station. Of course, other sensing means can be located in various positions on the machine 10 to determine when a bag 20 has dropped onto the cross conveyor 14 at the index station.

Two embodiments are shown in FIGS. 2a and 2b. These embodiments include a machine designed primarily for use with standard-sized pouches ("flighted"), and a machine which is fully adjustable for varying pouch widths and lengths ("non-flighted"), respectively.

In the flighted embodiment, shown in FIG. 2a, the cross conveyor 14 has several fixed flights 38 separated by a selected distance "a" which corresponds to, but is slightly greater than, the width of an individual bag 20. The width "b" of the cross conveyor 14 similarly is selected to correspond to the length of an individual bag 20 so that the entire bag is supported. Thus, the open space between flights 38, which is available at the index station once the cross conveyor 14 indexes horizontally, corresponds to the dimensions of each bag 20. As the bag 20 is discharged off the feed conveyor 12 it hits the back guide plate 40. The flights 38 also assist in lining up each bag 20 preparatory to packing. The bags 20 are indexed along the cross conveyor 14 by the stepped movement of the conveyor until an appropriate number of bags 20 (in this embodiment, two) are positioned directly beneath the vacuum shroud and head assembly 16 (see FIG. 5).

In the non-flighted embodiment, shown in FIG. 2b, the pouch 20 is positioned on the cross conveyor 14 by means of side guide plates 37 and 39 and a back guide plate 40. The back guide plate 40 may be adjusted forward and backward to compensate for varying lengths of pouches 20. The side guide plates 37, 39, connected to the end 36 of the feed conveyor 12, extend outward across the bag index station toward the back guide plate 40, with enough space left between the side guide plates 37, 39 and the back guide plate 40 to allow for adjustment of the back guide plate 40. The stationary upstream side guide plate 37 extends vertically downward to the surface of the cross conveyor 14. The downstream side guide plate 39 extends vertically downward toward the surface of the cross conveyor 14, with enough space left between said guide plate 39 and the cross conveyor 14 to allow a pouch 20, resting on the cross conveyor 14, to pass underneath the downstream side guide plate 39 as the pouch 2 is indexed toward the pick-up station located beneath the shroud head and guide assembly 16. The downstream side guide plate 39 is slidably connected to the feed conveyor 12 such that the lateral position of the downstream side guide plate 39, relative to the feed conveyor 12, may be adjusted to provide for varying widths of pouches 20. As shown in FIG. 2b, both side guide plates 37, 39 have angled portions at their respective feed conveyor ends to direct the pouches 20 between said plates 37, 39.

In the non-flighted embodiment, an encoder 41, located on the cross conveyor 14, senses the belt travel of said conveyor 14 and sends a corresponding signal to the programmable logic controller (not shown). Thus, said controller can vary belt travel of the cross conveyor 14 to correspond to varying bag widths and preferred gap widths. The movement of the conveyor belt can be programmed, for example, to group an appropriate number of four, five, or six inch wide pouches together for pick-up, with only a one inch gap between pouches in each such grouping, and leave a two inch gap between groupings.

In addition, in the non-flighted embodiment, if the gap widths between bags 20 are kept more or less constant for bags of various widths, more smaller-width bags can be accommodated on the cross conveyor 14. A swivel support 43 at the receiving end of the feed conveyor 12 permits the position of the end 36 of the feed conveyor 12, and therefore the distance between the index station and the pick-up station, to be adjusted to accommodate a predetermined number of bags. Thus, the cross conveyor 14 can accommodate the maximum number of pouches 20 over this distance with a minimal gap between pouches. As with the flighted embodiment, the bags 20 are then indexed along the cross conveyor 14 by the stepped movement of the conveyor until two bags 20 are positioned directly beneath the vacuum shroud and head assembly 16 (see FIG. 5).

Figure 5:
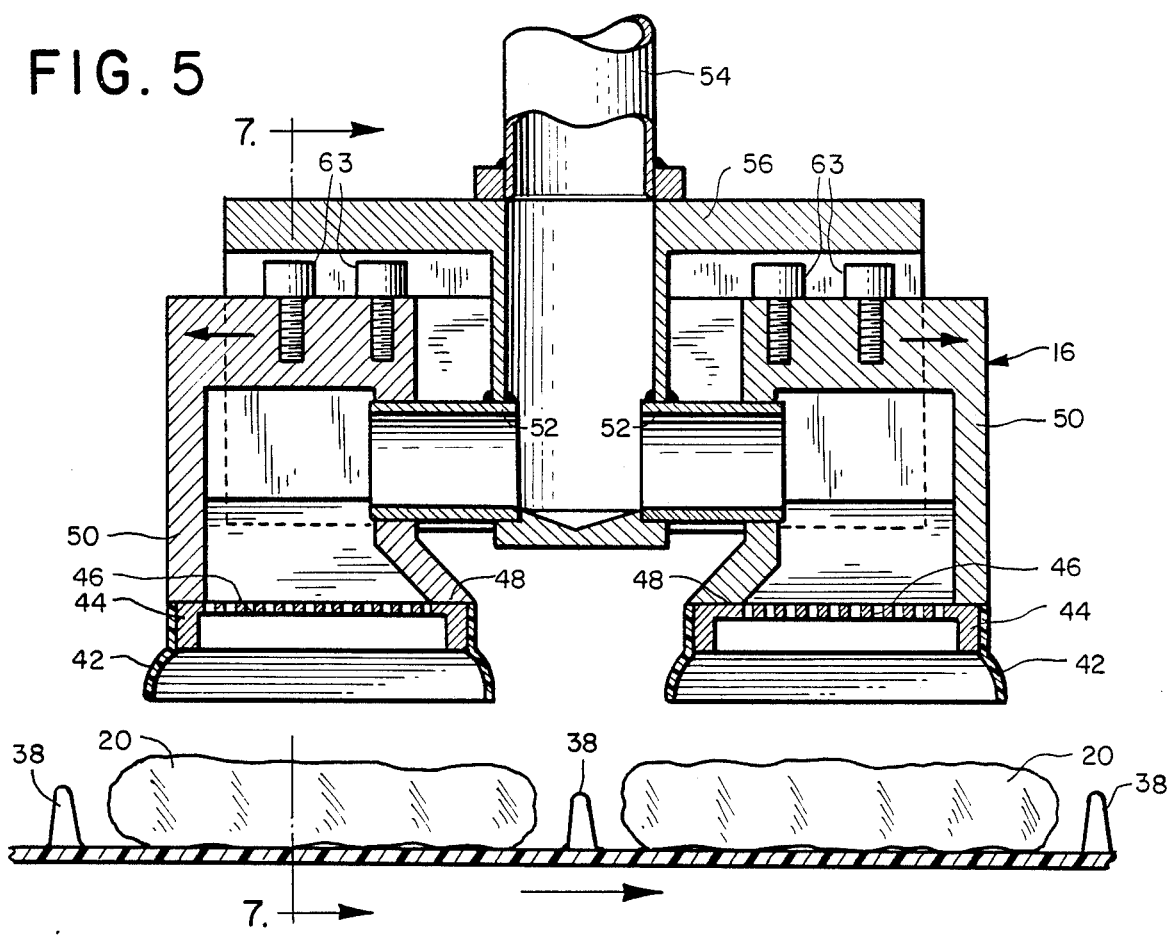
FIG. 5 is a fragmentary sectional view of the vacuum head assembly in its open mode over the indexing conveyor.
Figure 6:
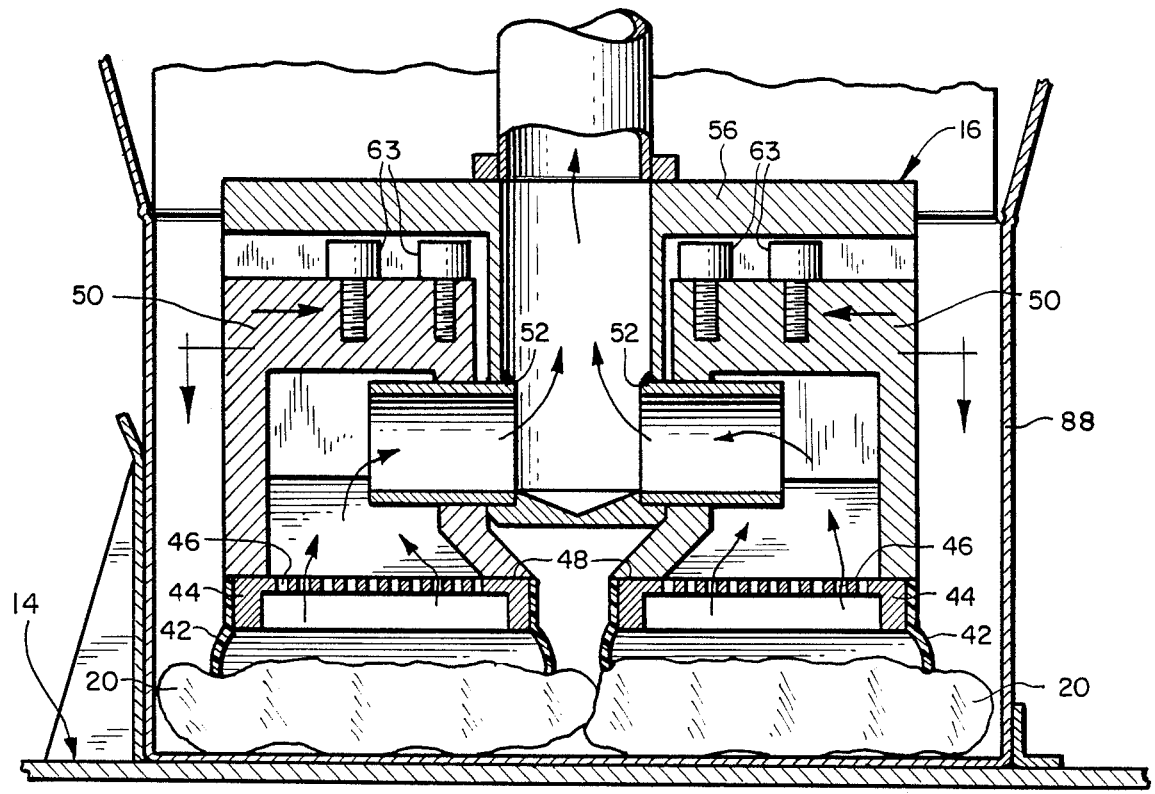
FIG. 6 is a fragmentary sectional view of the vacuum head assembly in its lowered, closed position.
Figure 7:
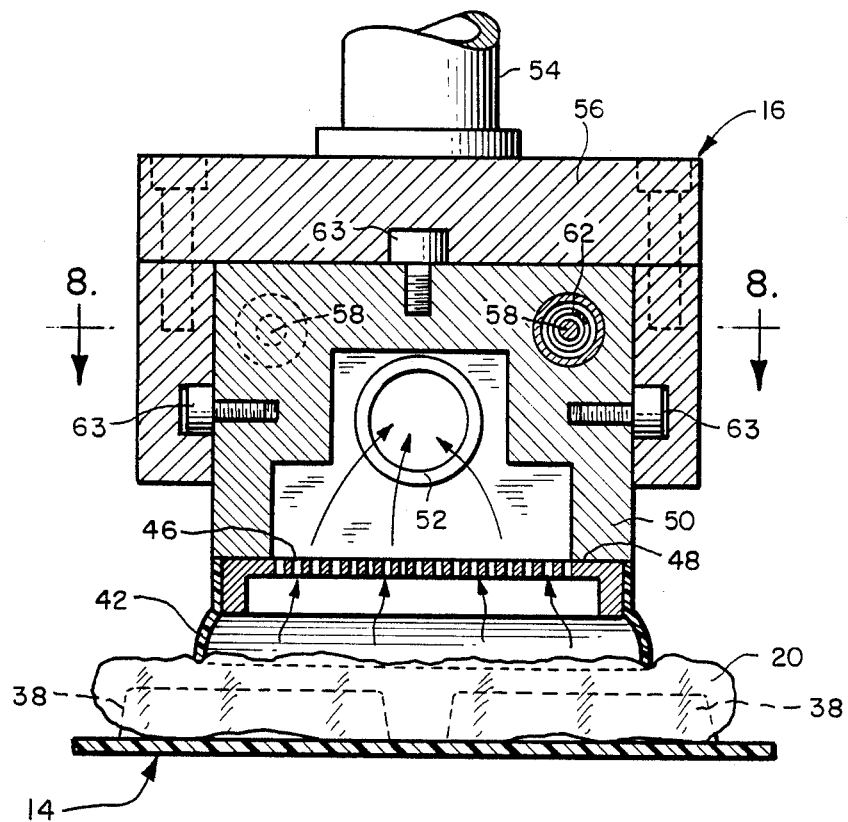
FIG. 7 is a fragmentary sectional view taken along line 7—7 in FIG. 5.
Figure 8:
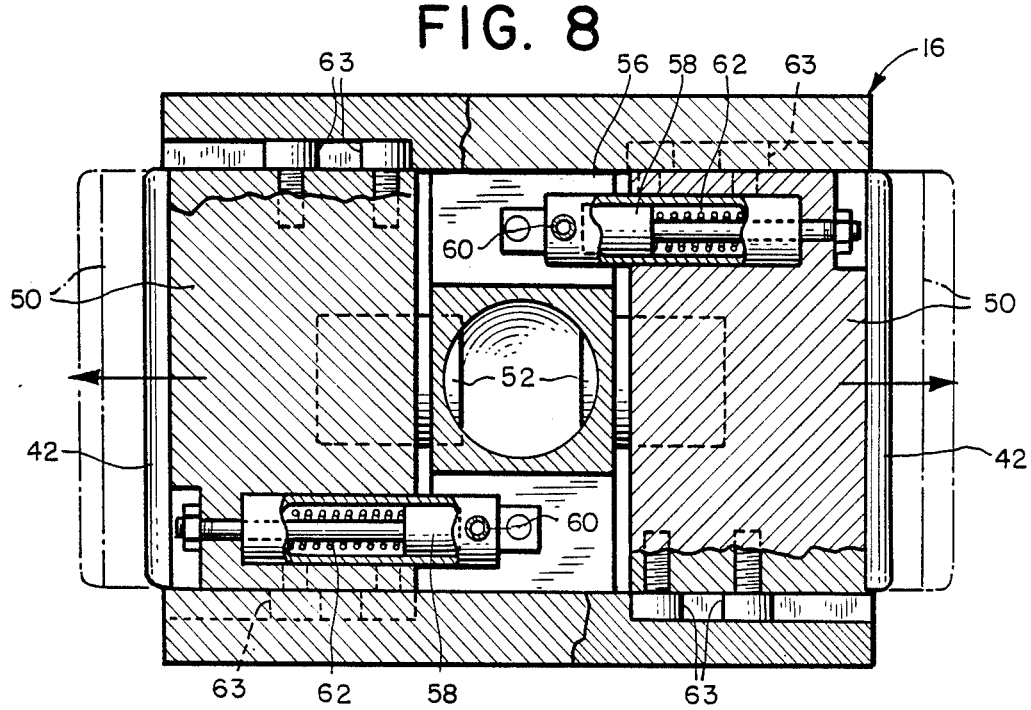
FIG. 8 is a fragmentary sectional view taken along line 8—8 of FIG. 7.

In either embodiment, the vacuum shroud and head assembly 16, as shown in FIG. 5, consists primarily of a pair of flexible shrouds 42 fitted at their uppermost end over inverted cup-like frames 44. These frames 44 have a plurality of generally uniformly spaced holes or vacuum ports 46 drilled through their horizontal surface 48 to enable the shrouds 42 to be put under a vacuum when appropriate. The frames 44 are attached to positioning sleeves 50, along their horizontal surfaces 48. The positioning sleeves 50 are connected via tubes 52 and 54 to a vacuum source (not shown). The vacuum source provides the necessary relatively small amount of suction required to grip the bags 20 and carry the bags 20 away from the cross conveyor 14 when the shrouds 42 are lowered over the bags. The positioning sleeves 50 can be translated in and out horizontally with respect to the vacuum packing head casing 52 via a pair of spring and air activated pistons 58 (See FIG. 8). Pressurized air entering through passages 60 act against pistons 58 and springs 62. With the air pressure on, positioning sleeves 50 are spread apart as shown in FIG. 5. With the air pressure off, springs 62 force the positioning sleeves 50 together, as shown in FIG. 6. The motions of the positioning sleeves 50 are controlled by guides 63 in the cam follower slots 61.

The vacuum head assembly 16, as a whole, moves both vertically and horizontally during the packing process. The carriage assembly 64, shown in FIGS. 3, 4a and 4b, supports the vacuum head assembly via several shafts 66 which are slidably connected to the carriage assembly 64. Suitable double-action pneumatic cylinders (not shown), such as the piston 86 shown in FIG. 3, provide the mechanism which powers the up and down stroke of the vacuum head assembly in response to a signal from the control system. The carriage assembly 64 is slidably interconnected on the horizontal axis via shafts 82 to the carriage frame 84. The carriage is powered in the horizontal axis by means of an air-powered piston 86 driving shaft 87. Horizontal movement is regulated by the control system.

Figure 4A:
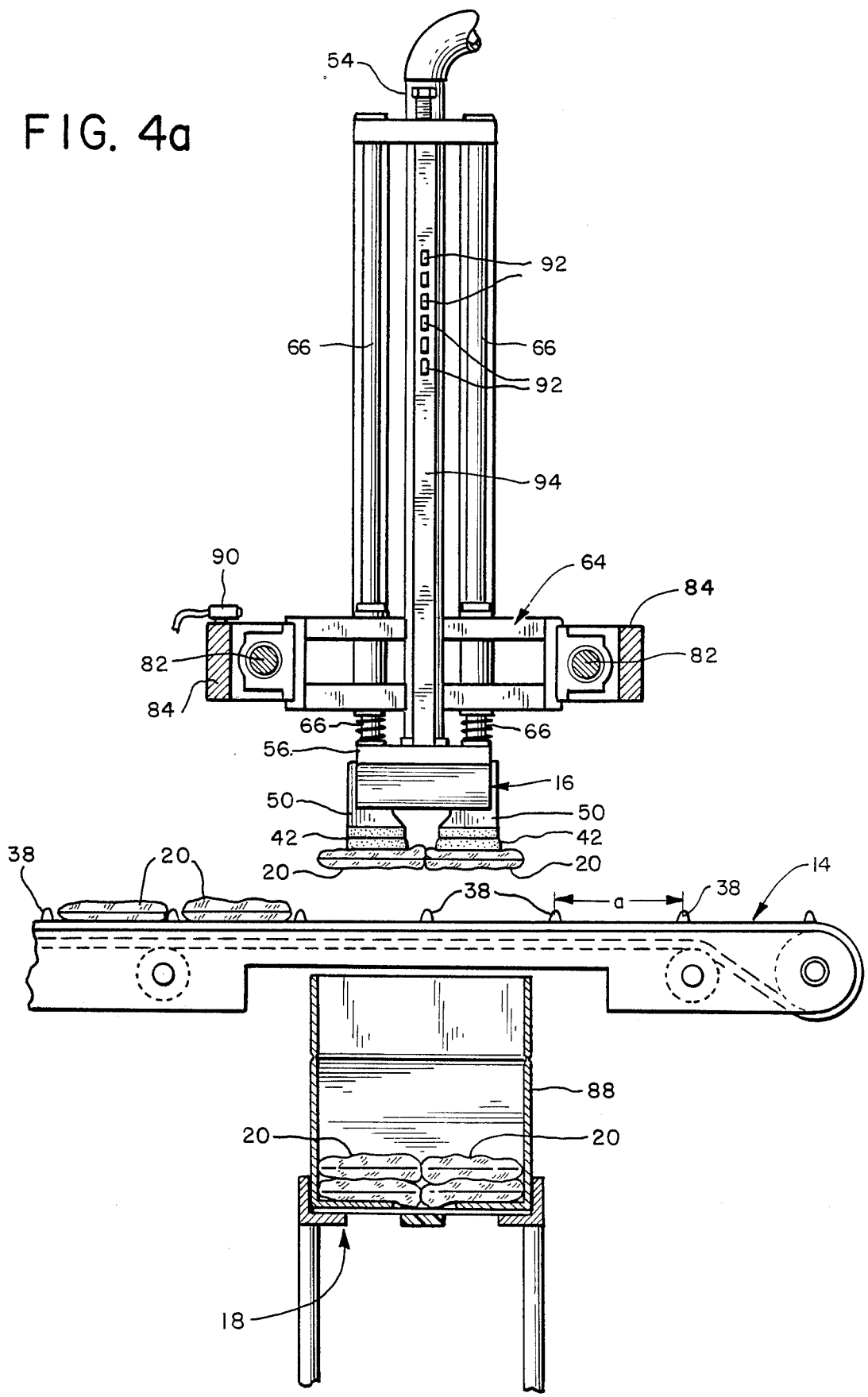
FIG. 4a is a fragmentary cross-sectional view taken along line 4a—4a in FIG. 1.
Figure 4B:
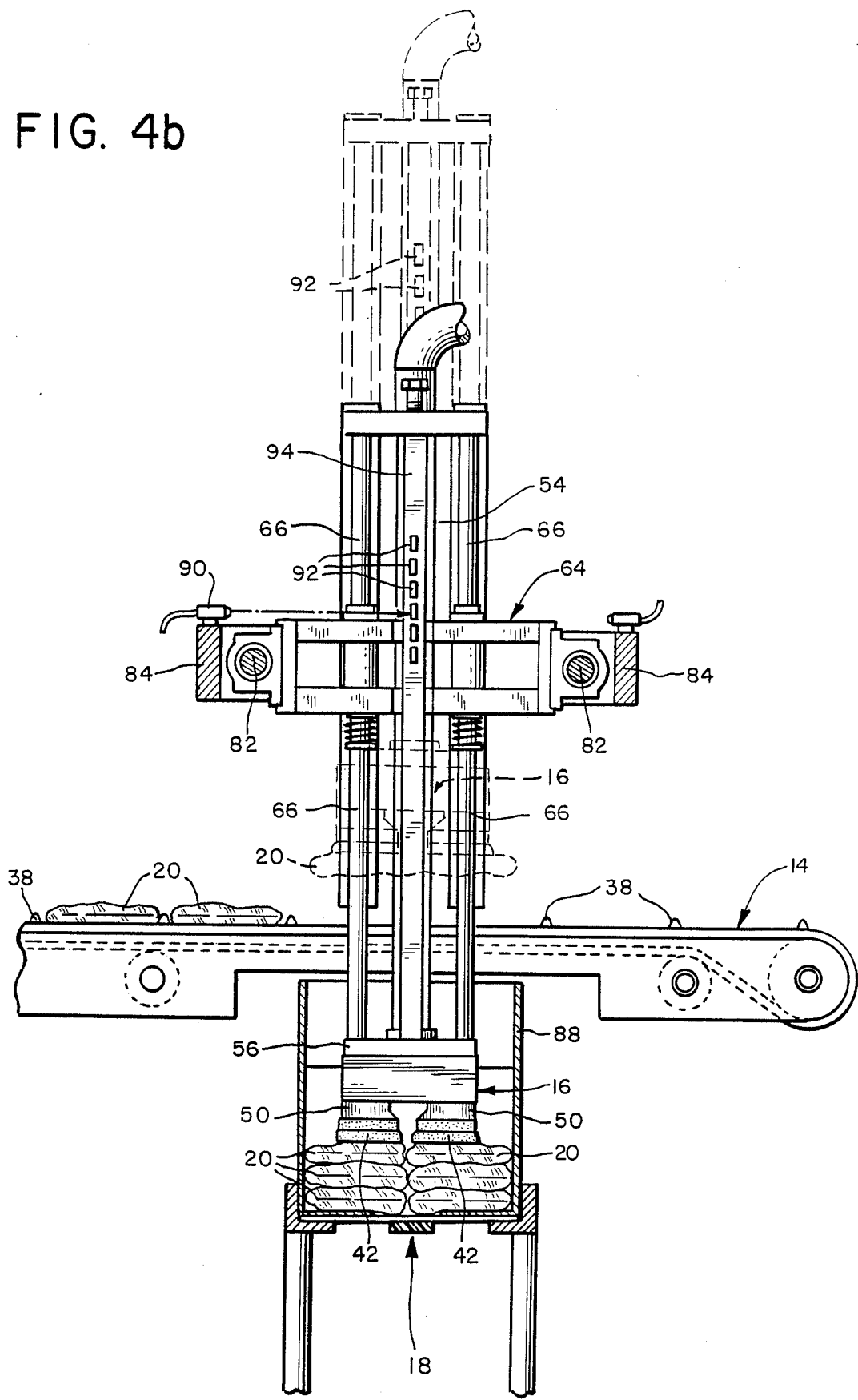
FIG. 4b is a fragmentary cross-sectional view taken along the same line as FIG. 4a, showing the packing mechanism in its downward position.

The head assembly 16, at rest, is positioned directly above a pick-up station with the positioning sleeves 50 spread apart (open). Once the control system has indexed the appropriate number of bags 20 (two or more) to the pick-up station, the control system activates the head assembly 16, lowering it to the bags 20 and applying suction to the vacuum shrouds 42. A relatively low vacuum force, on the order of 4 inches of mercury (Hg) is applied to the shrouded vacuum head assembly to gently grip the pouches 20 while the pouches are on the conveyor 14. The vacuum head assembly 16 is then moved vertically upward, carrying the bags 20 from the conveyor 14. At the top of its stroke, the vacuum head assembly 16 pauses while the carriage is indexed horizontally so that the vacuum head assembly 16, and therefore the bags 20, are poised at a packing station directly over a corrugated box 88 adjacent to the cross conveyor 14. The box conveyor 18 functions to position a box 88 below the vacuum head assembly 16 at the packing station. The positioning sleeves 50 then close, bringing the bags 20 together as shown in FIGS. 4a and b. The vacuum head assembly 16 is then lowered into the box 88 at the packing station.

Provision is made for packing different layers of bags in each box by using a photoelectric sensor 90 and a series of flags 92 attached to a shaft 94 which is, in turn, connected to the vacuum head assembly 16. Each time the vacuum head assembly 16 drops into a box 88 a certain number of flags 92 break the beam directed to the photoelectric sensor 90. The data is collected by the programmable logic control system, and the length of the subsequent stroke is reduced so that one less flag 92, or a programmed different number of flags, breaks the beam and the vacuum head assembly 16 does not penetrate the box 88 as deeply during its subsequent stroke. This operation is continued in a sequence that packs additional layers of bags 20 in the box 88 until the box is completely packed.

In operation, the pouches 20, 22 are dropped onto the feed conveyor 12 at the receiving end 24. Pouches 20, 22 move up the feed conveyor 12 past sensors 28, 30. If the bags are improperly spaced or still attached as at 22, a lever 32 swings out across the feed conveyor 12 and deflects the improperly fed bags 22 off the side of the feed conveyor 12. Properly fed pouches 20 advance up the feed conveyor 12, past another sensor 34, and drop onto the cross conveyor 14 at the index station. In the flighted embodiment, the pouches 20 are longitudinally and laterally positioned on the cross conveyor 14 by various flights 38 and by the back guide plate 40, respectively. In the non-flighted embodiment, the pouches 20 are longitudinally positioned on the cross conveyor 14 by the adjustable side guide plates 37, 39 extending from the feed conveyor 12 and laterally positioned by the adjustable back guide plate 40. The control system indexes the cross conveyor after each pouch 20 drops onto the cross conveyor 14 by means of a time delay circuit which is activated each time a pouch 20 passes sensor 34. In the non-flighted embodiment, an encoder 41 which senses belt travel stops the belt travel. On the flighted embodiment, the belt is stopped by either a micro switch or photoeye which senses the flight. The cross conveyor 14 transports the pouches 20 to the pick-up station. Once the control system has indexed two or more pouches 20 beneath the vacuum head assembly 16, the control system activates the vacuum head assembly 16, starting the suction running through the shrouds or vacuum cups 42 and lowering the shrouds 42 to the pouches 20 on cross conveyor 14. The vacuum head assembly 16, with the pouches 20 gripped by the suction running through the shrouds 42 rises to a predetermined point. The control system then activates an air-powered piston 86 which slides the carriage assembly 64, together with the vacuum head assembly 16, horizontally to the packing station. In this position, the control system also activates a pneumatic power source which closes the positioning sleeves 50 on which the shrouds 42 are mounted, thereby nestling he pouches 20 against each other.

The vacuum head assembly 16 is then lowered into an empty corrugated box 88 which is located at the packing station. With each thrust of the vacuum head assembly 16 into the corrugated box 88, a given number of flags 92 mounted on a shaft 94 which, in turn, is mounted to the vacuum head assembly 16, pass the photoelectric sensor 90. The control system reduces the length of stroke of the vacuum head assembly 16 with each successive thrust, such that fewer flags pass the sensor 90, to provide for the varying depth between layers of pouches 20 in the packed box 88. Once a box 88 is fully packed (with a predetermined number of layers), a new box is positioned at the packing station by the box conveyor and the control system increases the length of stroke of the head assembly 16 for a new cycle.

The vacuum shroud has a number of distinct advantages over the prior art. The flexible shroud covers a relatively large surface area of the pouch. The generally uniformly spaced vacuum ports 46 assures that a suction force will be dispersed across a large portion of the surface area of the pouch. Therefore, the pouch is not gripped at localized points as with suction cups, thereby minimizing the potential for damage to the pouch. Furthermore, less vacuum is necessary to grip the pouch firmly as compared to using single suction cups. The potential for damage is thereby further reduced. The flexibility of the shroud and the spacing of the ports 46 also makes the vacuum head assembly widely adaptable over a range of pouch sizes. For example, the machine can be built where adaptable using suction cups.

This packing machine can also accommodate bags of varying dimensions without equipment changes, as illustrated by the non-flighted embodiment.

An additional advantage of this packing machine for pouches is that the machine and control system can be adjusted to pack however many bags the box used can accommodate in one layer. In the illustrated embodiment, only two pouches are packed at a time. However, alternate embodiments of the present invention could incorporate packing three or more bags simultaneously by making the necessary revisions to the vacuum head assembly 16, such as by adding additional heads. It has been found, however, that excellent results may be obtained using the embodiment described herein.

Of course, it should be understood that various changes and modifications to the preferred embodiments described herein will be apparent to those skilled in the art. Such changes and modifications can be made without departing from the spirit and scope of the present invention. It is, therefore, intended that such changes and modifications be covered by the following claims.

I claim:

1. A packing machine for pouches or other flexible containers of variable dimensions comprising:

an indexable conveyor;

feed means to discharge pouches onto said conveyor in a selected orientation comprising a sideless feed conveyor wherein said feed conveyor includes sensing means to sense the relative position of the pouches being fed toward said indexable conveyor and rejection means operatively controlled by said position sensing means to reject pouches from said feed conveyor when adjacent pouches being fed by said feed conveyor are sensed to be in a predefined improper relationship;

control means for indexing said conveyor through a controlled, variable distance to move said pouches of variable dimensions into a pick-up station;

a vacuum head assembly positioned in operative relationship to said conveyor including vacuum means and a shrouded vacuum head means adapted to grip said pouches at said pick-up station;

means to position a packing carton at a packing station;

motion control means to position said vacuum head assembly and said gripped pouches adjacent the packing carton at the packing station; and adjustable drive means to move said vacuum head a variable distance into said carton at the packing station so that the release of said vacuum force in said head will discharge the pouches at a selected position in said carton.

2. The packing machine defined in claim 1 wherein the rejection means comprises a lever positioned longitudinally along one side of said feed conveyor and adapted to switng out across the feed conveyor and deflect improperly positioned pouches off one side of the feed conveyor.

* * * * *

UNITED STATES PATENT AND TRADEMARK OFFICE
CERTIFICATE OF CORRECTION

PATENT NO. : 4,800,703
DATED : January 31, 1989
INVENTOR(S) : James A. Goodman

It is certified that error appears in the above-identified patent and that said Letters Patent is hereby corrected as shown below:

In column 4, line 4, please delete "2" and substitute therefor --20--.

In column 6, line 23, please delete "he" and substitute therefor --the--.

IN THE CLAIMS

In column 8, line 21, please delete "switng" and substitute therefor --swing--.

Signed and Sealed this

Twenty-first Day of May, 1991

Attest:

HARRY F. MANBECK, JR.

*Attesting Officer*        *Commissioner of Patents and Trademarks*